US009677025B2

(12) United States Patent
Voge et al.

(10) Patent No.: US 9,677,025 B2
(45) **Date of Patent: *Jun. 13, 2017**

(54) ELASTOMER COMPOSITION FOR A TIRE OBJECT HAVING A SELF-SEALING PROPERTY

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Bozena Voge, Cournon d'Auvergne (FR); Vincent Pelissier, Romagnat (FR); José Merino Lopez, Riom (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,202

(22) Filed: Oct. 14, 2015

(65) Prior Publication Data

US 2016/0032215 A1 Feb. 4, 2016

Related U.S. Application Data

(63) Continuation of application No. 13/576,151, filed as application No. PCT/EP2011/050856 on Jan. 21, 2011, now Pat. No. 9,243,133.

(30) Foreign Application Priority Data

Jan. 28, 2010 (FR) ..................................... 10 50593

(51) Int. Cl.

| | |
|---|---|
| ***C10M 161/00*** | (2006.01) |
| ***B29B 7/42*** | (2006.01) |
| ***B29C 47/00*** | (2006.01) |
| ***B29C 47/06*** | (2006.01) |
| ***B29C 47/60*** | (2006.01) |
| ***B29C 47/64*** | (2006.01) |
| ***B29D 30/06*** | (2006.01) |
| ***B60C 19/12*** | (2006.01) |
| ***C08L 7/00*** | (2006.01) |
| ***C08L 9/00*** | (2006.01) |
| ***C08L 9/06*** | (2006.01) |
| ***C08L 23/00*** | (2006.01) |

(Continued)

(52) U.S. Cl.

CPC ........... *C10M 161/00* (2013.01); *B29B 7/421* (2013.01); *B29B 7/424* (2013.01); *B29B 7/7495* (2013.01); *B29C 47/0019* (2013.01); *B29C 47/065* (2013.01); *B29C 47/364* (2013.01); *B29C 47/6012* (2013.01); *B29C 47/64* (2013.01); *B29D 30/0685* (2013.01); *B60C 19/122* (2013.04); *C08L 7/00* (2013.01); *C08L 9/00* (2013.01); *C08L 9/06* (2013.01); *C08L 23/00* (2013.01); *C08L 25/08* (2013.01); *C08L 45/00* (2013.01); *B29C 47/0021* (2013.01); *B29C 47/043* (2013.01); *B29C 47/1027* (2013.01); *B29C 47/1045* (2013.01); *B29C 47/1063* (2013.01); *B29C 47/1081* (2013.01); *B29C 47/38* (2013.01); *B29C 73/163* (2013.01); *B29C 2947/92704* (2013.01); *B29D 2030/0686* (2013.01); *B29K 2007/00* (2013.01); *B29K 2009/00* (2013.01); *B29K 2105/16* (2013.01); *B29L 2030/00* (2013.01); *C08K 3/0033* (2013.01); *C08K 5/01* (2013.01); *C08L 57/02* (2013.01); *C08L 2205/03* (2013.01); *Y10T 428/1386* (2015.01)

(58) Field of Classification Search

CPC .............. B29D 30/0685; B60C 19/122; B29L 2030/00; C08L 7/00; C08L 9/00; C08K 3/0033; C08K 5/01

See application file for complete search history.

(56) References Cited

U.S. PATENT DOCUMENTS

| | | |
|---|---|---|
| 3,340,214 A | 9/1967 | David |
| 3,663,268 A | 5/1972 | Wilson |

(Continued)

FOREIGN PATENT DOCUMENTS

| | | |
|---|---|---|
| DE | 102007031274 | 1/2009 |
| FR | 2877348 | 5/2006 |

(Continued)

*Primary Examiner* — Wenwen Cai

(74) *Attorney, Agent, or Firm* — Cozen O'Connor

(57) ABSTRACT

Elastomer composition having a self-sealing property which can be used in particular as puncture-resistant layer in an inflatable article, based on at least (phr meaning parts by weight per 100 parts of solid elastomer): a blend of at least two solid elastomers, a polybutadiene or butadiene copolymer elastomer, referred to as "elastomer A", and a natural rubber or synthetic polyisoprene elastomer, referred to as "elastomer B", the elastomer A: elastomer B ratio by weight being within a range from 10:90 to 90:10; between 30 and 90 phr of a hydrocarbon resin; from 0 to less than 30 phr of filler. Inflatable article, such as a tire, provided with a puncture-resistant layer comprising this elastomer composition; the puncture-resistant layer is advantageously used in combination with an airtight layer, for example based on butyl rubber or TPS elastomer, in order to form, in the inflatable article, an airtight and puncture-resistant laminate.

8 Claims, 2 Drawing Sheets

(51) Int. Cl.

| | |
|---|---|
| ***C08L 25/08*** | (2006.01) |
| ***C08L 45/00*** | (2006.01) |
| ***B29C 47/36*** | (2006.01) |
| ***B29B 7/74*** | (2006.01) |
| *B29C 47/04* | (2006.01) |
| *B29C 47/10* | (2006.01) |
| *B29C 47/38* | (2006.01) |
| *B29C 73/16* | (2006.01) |
| *B29K 7/00* | (2006.01) |
| *B29K 9/00* | (2006.01) |
| *B29L 30/00* | (2006.01) |
| *C08K 3/00* | (2006.01) |
| *C08K 5/01* | (2006.01) |
| *C08L 57/02* | (2006.01) |
| *B29K 105/16* | (2006.01) |

(56) References Cited

U.S. PATENT DOCUMENTS

| | | | |
|---|---|---|---|
| 5,015,752 | A | 5/1991 | Bergfeld |
| 2003/0230376 | A1 | 12/2003 | Smith et al. |
| 2006/0194898 | A1 * | 8/2006 | Sanda, Jr. ............ B29C 73/163 523/166 |
| 2010/0256275 | A1 | 10/2010 | Lopitaux |
| 2011/0174421 | A1 | 7/2011 | Voge et al. |
| 2011/0198010 | A1 | 8/2011 | Voge et al. |

FOREIGN PATENT DOCUMENTS

| | | |
|---|---|---|
| JP | 62-81480 | 4/1987 |
| WO | WO 2008/141749 | 11/2008 |
| WO | WO2009/059709 | 5/2009 |
| WO | WO2009/156050 | 12/2009 |
| WO | WO 2010/009849 | 1/2010 |
| WO | WO 2010/012413 | 2/2010 |

* cited by examiner

ELASTOMER COMPOSITION FOR A TIRE OBJECT HAVING A SELF-SEALING PROPERTY

RELATED APPLICATION

This application is a continuation of U.S. patent application Ser. No. 13/576,151 filed Oct. 18, 2012 which is a national stage of International Application No. PCT/EP2011/050856 filed Jan. 21, 2011. Priority is also claimed of French application No. 10/50593 filed Jan. 28, 2010, the entire content of all of which are hereby incorporated herein by reference.

FIELD OF THE INVENTION

The present invention relates to compositions having a self-sealing property (self-sealing compositions) and to their use as puncture-resistant layers in any type of "inflatable" article, that is to say, by definition, any article which takes its usable shape when it is inflated with air.

It relates more particularly to the use of such compositions in inflatable articles, in particular in tires, for sealing possible holes due to perforations in service.

BACKGROUND OF THE INVENTION

For some years, in particular, tire manufacturers have been making particularly great efforts to develop novel solutions to a problem dating from the very beginning of the use of wheels fitted with tires of inflated type, namely how to allow the vehicle to continue its journey despite a significant or complete loss of pressure from one or more tires. For decades, the spare wheel was regarded as the sole and universal solution. Then, more recently, the considerable advantages related to its possible removal have become apparent. The concept of "extended mobility" was developed. The associated techniques make it possible to run with the same tire, according to certain limits to be observed, after a puncture or a fall in pressure. This makes it possible, for example, to drive to a breakdown point without having to halt, under often hazardous conditions, to fit the spare wheel.

Self-sealing compositions capable of making it possible to achieve such an objective, by definition capable of automatically ensuring, that is to say without any external intervention, the airtightness of a tire in the event of perforation of the latter by a foreign body, such as a nail, are particularly difficult to develop.

In order to be able to be used, a self-sealing layer has to satisfy numerous conditions of a physical and chemical nature. In particular, it has to be effective over a very wide range of operating temperatures, this being the case over the whole of the lifetime of the tires. It has to be capable of sealing the hole when the perforating article remains in place; when the latter is expelled, it has to be able to fill in the hole and to render the tire airtight.

Numerous solutions have been devised but have not been able truly to be deployed in vehicle tires, in particular for lack of stability over time or of effectiveness under extreme operating temperature conditions, or also due to difficulties in manufacturing and/or using these self-sealing compositions.

Thus, in order to contribute to maintaining good high-temperature effectiveness, the document U.S. Pat. No. 4,113,799 (or FR-A-2 318 042) provided, as self-sealing layer, a composition comprising a combination of butyl rubbers having high and low molecular weights which are partly crosslinked, optionally in the presence of a small portion of thermoplastic stirene elastomer.

The document U.S. Pat. No. 4,228,839 provided, as tire self-sealing layer, a rubber mixture comprising a first polymer material which decomposes when irradiated, such as polyisobutylene, and a second polymer material which crosslinks when irradiated, preferably a butyl rubber.

The document U.S. Pat. No. 4,426,468 has for its part also provided a tire self-sealing composition based on cross-linked butyl rubber having a very high molecular weight.

A known disadvantage of butyl rubbers is that they exhibit significant hysteresis losses (i.e., a high tan δ level) over a broad temperature spectrum, a disadvantage which has repercussions on the self-sealing compositions themselves with a strong increase in the hysteresis and significant penalization of the rolling resistance of the tires.

Self-sealing compositions based on an unsaturated diene elastomer (natural rubber) have also been described for the same type of application, in particular in U.S. Pat. Nos. 4,913,209, 5,085,942 and 5,295,525.

These compositions are characterized by the combined presence of a high content of hydrocarbon resin as tackifying agent ("tackifier"), always greater than 100 parts by weight per 100 parts of solid elastomer, and of a large amount of elastomer (isoprene) in the liquid state. In point of fact, such a high resin content, apart from the fact that its incorporation requires a very long kneading of the elastomer matrix, can also be harmful to the hysteresis and consequently to the rolling resistance of the tires. In addition, a large amount of liquid elastomer gives a high fluidity to the composition, which is the source of other disadvantages, in particular of a risk of creep of the self-sealing composition during use at relatively high temperature (typically greater than 60° C.) frequently encountered during the use of some tires.

SUMMARY OF THE INVENTION

One object of the invention is to provide a novel composition having a self-sealing property which does not require a butyl rubber or significant amounts of hydrocarbon resin and liquid elastomer, and that exhibits, in an inflatable article, an improved puncture-resistant performance with respect to the self-sealing compositions of the prior art.

In order to attain this and other objects, one aspect of the present invention relates to an elastomer composition having a self-sealing property which can be used in particular as puncture-resistant layer in an inflatable article, the said composition being based on at least (phr meaning parts by weight per 100 parts of solid elastomer):

- a blend of at least two solid elastomers, a polybutadiene or butadiene copolymer elastomer, referred to as "elastomer A", and a natural rubber or synthetic polyisoprene elastomer, referred to as "elastomer B", the elastomer A: elastomer B ratio by weight being within a range from 10:90 to 90:10;
- between 30 and 90 phr of a hydrocarbon resin;
- from 0 to less than 30 phr of filler.

Another aspect of the present invention relates to an inflatable article, in the raw state (i.e., noncrosslinked state) and in the cured state (i.e., crosslinked or vulcanized state), provided with a puncture-resistant layer comprising a composition according to the invention.

Preferably, the inflatable article according to an embodiment of the invention, in particular a tire, also comprises an airtight layer which, in combination with the above puncture-resistant layer, constitutes an airtight and puncture-resistant laminate which is particularly advantageous when the laminate is positioned, for example, on the internal wall of the said article or tire.

The present invention relates in particular to tires intended to equip motor vehicles of passenger vehicle, including GT saloon, type, SUV (Sport Utility Vehicle) vehicles, two-wheel vehicles (in particular bicycles or motorcycles), aircraft, such as industrial vehicles chosen from vans, heavy-duty vehicles—that is to say, underground, bus, heavy road transport vehicles (lorries, tractors, trailers) or off-road vehicles, such as agricultural vehicles or earthmoving equipment—or other transportation or handling vehicles.

BRIEF DESCRIPTION OF THE DRAWINGS

The invention and its advantages will be easily understood in the light of the description and implementational examples which follow, and of FIGS. 1 and 2 relating to these examples, which give a simple diagrammatic representation, without observing a specific scale.

I. DETAILED DESCRIPTION

I-1. Definitions

Figure 1:
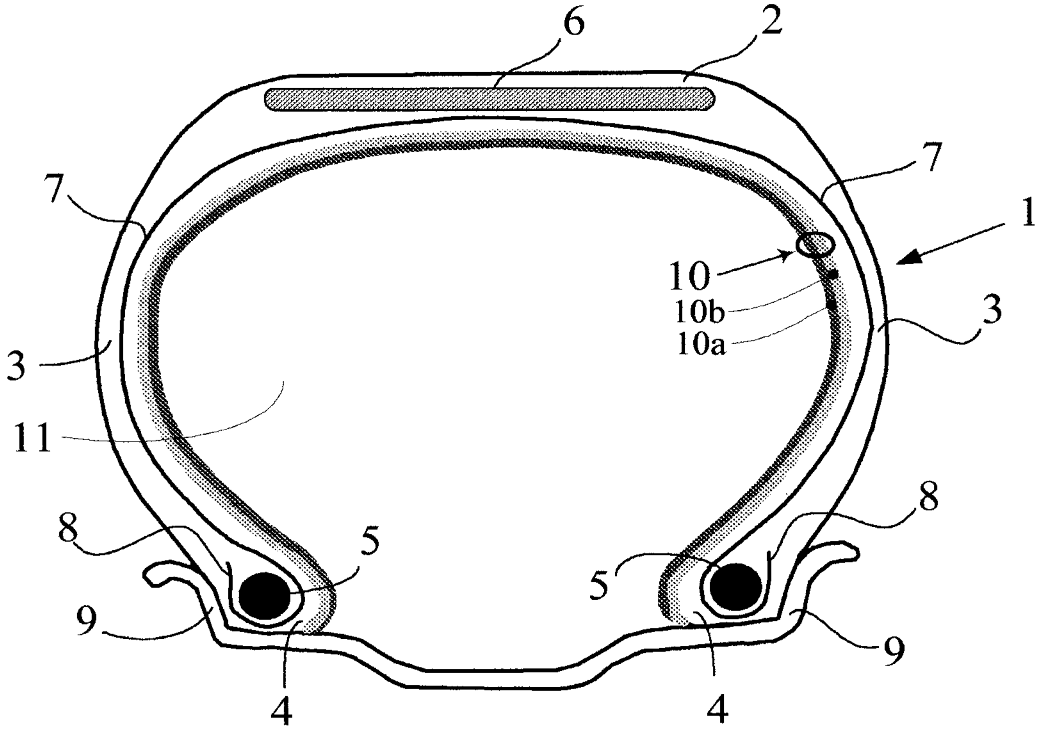
FIG. 1 shows, in radial cross section, an example of a tire using a composition having a self-sealing property in accordance with an embodiment of the invention.

In the present description, unless expressly indicated otherwise, all the percentages (%) indicated are % by weight.

Furthermore, any interval of values denoted by the expression "between a and b" represents the range of values greater than "a" and lower than "b" (that is to say, limits a and b excluded), whereas any interval of values denoted by the expression "from a to b" means the range of values ranging from "a" up to "b" (that is to say, including the strict limits a and b).

The abbreviation "phr" means parts by weight per hundred parts of elastomer in the solid state (of the total of the solid elastomers, if several solid elastomers are present).

The expression composition "based on" should be understood as meaning, generally, a composition comprising the mixture and/or the reaction product of its various components, it being possible for some of these components to be capable of reacting (indeed even intended to react) with one another, at least in part, during the various phases of manufacture of the composition, for example during its possible final crosslinking or vulcanization (curing).

Elastomer (or "rubber", the two being regarded as synonyms) of the "diene" type should be understood as meaning, in a known way, an elastomer resulting at least in part (i.e., a homopolymer or a copolymer) from diene monomers (i.e., from monomers carrying two carbon-carbon double bonds, whether conjugated or nonconjugated).

These diene elastomers can be classified into two categories, saturated or unsaturated. In the present patent application, "unsaturated" diene elastomer is understood to mean a diene elastomer resulting at least in part from conjugated diene monomers and having a content of units resulting from conjugated dienes which is greater than 30% (mol %). Thus it is that diene elastomers such as butyl rubbers or copolymers of dienes and of α-olefins of EPDM type, which can be described as "saturated" diene elastomers due to their reduced content of units of diene origin (always less than 15 mol %), are excluded from the preceding definition. The commonest diene elastomers of the unsaturated type are those selected from the group consisting of polybutadienes, natural rubber, synthetic polyisoprenes, butadiene copolymers, isoprene copolymers and the mixtures of such elastomers.

I-2. Measurements

I-2-A. Mooney Viscosity

The Mooney viscosity or plasticity characterizes, in a known way, solid substances. Use is made of an oscillating consistometer as described in Standard ASTM D1646 (1999). The Mooney plasticity measurement is carried out according to the following principle: the sample, analysed in the raw state (i.e., before curing), is moulded (formed) in a cylindrical chamber heated to a given temperature (for example 35° C. or 100° C.). After preheating for one minute, the rotor rotates within the test specimen at 2 revolutions/minute and the working torque for maintaining this movement is measured after rotating for 4 minutes. The Mooney viscosity (ML 1+4) is expressed in "Mooney unit" (MU, with 1 MU=0.83 newton·metre).

I-2-B. Brookfield Viscosity

The Brookfield viscosity characterizes, in a known way, liquid substances. The apparent viscosity according to the Brookfield method is measured at a given temperature (for example at 65° C.) according to European and International Standard EN ISO 2555 (1999). Use is made, for example, of a viscometer of the A type (for example RVT model) or of the B type (for example HAT model) at a rotational frequency preferably equal to 10 or 20 $min^{-1}$, with a No. of the spindle (1 to 7) suitable for the viscosity range measured (according to Appendix A of Standard EN ISO 2555).

I-2-C. Macrostructure of the Elastomers

The macrostructure (Mw, Mn and PI) and the distribution of the molar masses of an elastomer, whether in the liquid state or in the solid state, are characteristics known to a person skilled in the art, available in particular from the suppliers of elastomers, which can furthermore be measured by conventional techniques, such as GPC (Gel Permeation Chromatography) or SEC (Size Exclusion Chromatography).

To recapitulate, the SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, for example tetrahydrofuran, at a concentration of 1 g/litre. The solution is then filtered through a filter, for example with a porosity of 0.45 μm, before injection into the apparatus. The apparatus used is, for example, a "Waters Alliance" chromatographic line. The elution solvent is, for example, tetrahydrofuran, the flow rate is 0.7 ml/min and the temperature of the system is 35° C. A set of 4 "Waters" columns in series (names "Styragel HMW7", "Styragel HMW6E" and two "Styragel HT6E") is, for example, used. The injected volume of the solution of the polymer sample is, for example, 100 μl. The detector is a differential refractometer (for example "Waters 2410") which can be equipped with associated software for making use of the data (for example "Waters Millennium"). A Moore calibration is carried out with a series of commercial polystyrene standards having a low PI (less than 1.2), with known molar masses, covering the range of masses to be analysed. The weight-average molar mass (Mw), the number-average molar mass (Mn) and the polydispersity index (PI=Mw/Mn) are deduced from the data recorded (curve of distribution by mass of the molar masses).

I-2-D. Macrostructure of the Hydrocarbon Resins

The macrostructure (Mw, Mn and PI) is determined by SEC as indicated above for the elastomers: solvent tetrahydrofuran, temperature 35° C., concentration 1 g/litre, flow rate 1 ml/min, solution filtered through a filter with a porosity of 0.45 μm before injection (100 μl); Moore calibration with polystyrene standards; set of 3 "Waters" columns in series ("Styragel HR4E", "Styragel HR1" and "Styragel HR 0.5"), detection by differential refractometer (for example "Waters 2410") which can be equipped with operating software (for example "Waters Millennium").

All the values for molar masses shown in the present application are thus relative to calibration curves produced with polystyrene standards. All the values for glass transition temperature ("Tg") are measured in a known way by DSC (Differential Scanning calorimetry) according to Standard ASTM D3418 (1999).

I-3. Compositions of the Invention

The composition having a self-sealing property in accordance with the invention, in the raw state (i.e., noncrosslinked state) and in the cured state (i.e., crosslinked or vulcanized state), is thus an elastomer composition based on at least a blend of at least two specific solid unsaturated diene elastomers A and B and between 30 and 90 phr of a hydrocarbon resin as plasticizer. It has the other essential characteristic of being devoid of filler or, at the very most, of comprising less than 30 phr of such an optional filler.

I-3-A. Blend of Elastomers A and B

The composition of the invention has the first essential characteristic of comprising, preferably as predominant elastomer, a blend (or "mixture") of at least two solid elastomers:

(i) at least one (that is to say, one or more) polybutadiene or butadiene copolymer, referred to as "elastomer A", and (ii) at least one (that is to say, one or more) natural rubber or synthetic polyisoprene, referred to as "elastomer B".

Mention may in particular be made, as polybutadienes, of those having a content of 1,2-units of between 4 and 80% or those having a cis-1,4-content of greater than 80%. Mention may in particular be made, as butadiene copolymers, of butadiene-stirene copolymers (SBRs), butadiene-isoprene copolymers (BIRs) or stirene-butadiene-isoprene copolymers (SBIRs). SBR copolymers having a stirene content of between 5 and 50% by weight and more particularly between 20 and 40% by weight, a content of 1,2-bonds of the butadiene part of between 4 and 65% and a content of trans-1,4-bonds of between 20 and 80%, BIR copolymers having an isoprene content of between 5 and 90% by weight and a Tg of −40° C. to −80° C., SBIR copolymers having a stirene content of between 5 and 50% by weight and more particularly of between 10 and 40% by weight, an isoprene content of between 15 and 60% by weight and more particularly between 20 and 50% by weight, a butadiene content of between 5 and 50% by weight and more particularly of between 20 and 40% by weight, a content of 1,2-units of the butadiene part of between 4 and 85%, a content of trans-1,4-units of the butadiene part of between 6 and 80%, a content of 1,2-plus 3,4-units of the isoprene part of between 5 and 70% and a content of trans-1,4-units of the isoprene part of between 10 and 50%, and more generally any SBIR copolymer having a Tg of between −20° C. and −70° C., are suitable in particular.

More preferably still, the elastomer A is a butadiene homopolymer, in other words a polybutadiene, this polybutadiene preferably having a content (mol %) of cis-1,4-bonds of greater than 90%, more preferably greater than 95%.

The elastomer B is natural rubber or a synthetic polyisoprene; use is preferably made, among synthetic polyisoprenes, of cis-1,4-polyisoprenes, preferably those having a content (mol %) of cis-1,4-bonds of greater than 90%, more preferably still of greater than 95%, in particular of greater than 98%.

The above elastomers A and B can, for example, be block, random, sequential or microsequential elastomers and can be prepared in dispersion or in solution; they can be coupled and/or star-branched and/or branched or also functionalized, for example with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or of polyether groups (such as described, for example, in U.S. Pat. No. 6,503,973). Mention may also be made, as other examples of such functionalized elastomers, of elastomers (such as SBR, BR, NR or IR) of the epoxidized type.

According to a preferred embodiment of the invention, the elastomer A: elastomer B ratio by weight is preferably within a range from 20:80 to 80:20, more preferably still within a range from 30:70 to 70:30, in particular from 40:60 to 60:40.

It is in such respective concentration ranges of the two elastomers A and B that the best compromises in terms of self-sealing properties and operating temperature have been observed, according to the different specific uses targeted, in particular during use at low temperature (in particular at a temperature of less than 0° C.), in comparison with the use of natural rubber alone or of polybutadiene alone.

The elastomers A and B are by definition solid. In contrast to liquid, solid is understood to mean any substance not having the ability to eventually assume, at the latest after 24 hours, solely under the effect of gravity and at ambient temperature (23° C.), the shape of the container in which it is present.

In contrast to elastomers of the liquid type which can optionally be used as liquid plasticizers in the composition of the invention, the elastomers A and B and their blend are characterized by a very high viscosity: their Mooney viscosity in the raw state (i.e., noncrosslinked state) ML (1+4), measured at 100° C., is preferably greater than 20, more preferably greater than 30, in particular between 30 and 130.

According to another possible definition, solid elastomer is also understood to mean an elastomer having a high molar mass, that is to say typically exhibiting a number-average molar mass (Mn) which is greater than 100 000 g/mol; preferably, in such a solid elastomer, at least 80%, more preferably at least 90%, of the area of the distribution of the molar masses (measured by SEC) is situated above 100 000 g/mol.

Preferably, the number-average molar mass (Mn) of each of the elastomers A and B is between 100 000 and 5 000 000 g/mol, more preferably between 150 000 and 4 000 000 g/mol; in particular, it is between 200 000 and 3 000 000 g/mol, more particularly between 200 000 and 1 500 000 g/mol. Preferably, their polydispersity index PI (Mw/Mn) is between 1.0 and 10.0, in particular between 1.0 and 3.0 as regards the elastomer A and between 3.0 and 8.0 as regards the elastomer B.

A person skilled in the art will know how to adjust, in the light of the present description and as a function of the specific application targeted for the composition of the invention, the average molar mass and/or the distribution of the molar masses of the elastomers A and B. According to a specific embodiment of the invention, he can, for example, opt for a broad distribution of molar masses. If he wishes to favour the fluidity of the self-sealing composition, he can instead favour the proportion of low molar masses. According to another specific embodiment, which may or may not be combined with the preceding embodiment, he can also favour the proportion of intermediate molar masses for the purpose of instead optimizing the self-sealing (filling) role of the composition. According to another specific embodiment, he can instead favour the proportion of high molar masses for the purpose of increasing the mechanical strength of the self-sealing composition.

These various molar mass distributions can be obtained, for example, by compounding different starting diene elastomers (elastomers A and/or elastomers B).

According to a preferred embodiment of the invention, the above blend of solid elastomers A and B constitutes the only solid elastomer present in the self-sealing composition of the invention, that is to say that the overall content of the two elastomers A and B is then 100 phr; in other words, the contents of elastomer A and elastomer B are consequently each within a range from 10 to 90 phr, preferably from 20 to 80 phr, more preferably from 30 to 70 phr, in particular from 40 to 60 phr.

According to another specific embodiment of the invention, when the blend of elastomers A and B does not constitute the only solid elastomer of the composition of the invention, the said blend preferably constitutes the predominant solid elastomer by weight in the composition of the invention; more preferably, the overall content of the two elastomers A and B is then greater than 50 phr, more preferably greater than 70 phr, in particular greater than 80 phr.

Thus, according to specific embodiments of the invention, the blend of elastomers A and B might be combined with other (solid) elastomers which are minor components by weight, whether unsaturated or saturated diene elastomers (for example butyl elastomers) or elastomers other than diene elastomers, for example thermoplastic stirene elastomers (referred to as "TPSs"), for example selected from the group consisting of stirene/butadiene/stirene (SBS), stirene/isoprene/stirene (SIS), stirene/butadiene/isoprene/stirene (SBIS), stirene/isobutylene/stirene (SIBS), stirene/ethylene/butylene/stirene (SEBS), stirene/ethylene/propylene/stirene (SEPS) and stirene/ethylene/ethylene/propylene/stirene (SEEPS) block copolymers, and the mixtures of these copolymers.

Surprisingly, the above blend of elastomers A and B, which is devoid of filler (or with a very low content of filler), has proved to be capable, after addition of a thermoplastic hydrocarbon resin within the recommended narrow range, of fulfilling the function of an effective self-sealing composition, as is explained in detail in the continuation of the account.

I-3-B. Hydrocarbon Resin

The second essential constituent of the self-sealing composition is a hydrocarbon resin.

The designation "resin" is reserved in the present patent application, by definition known to a person skilled in the art, for a compound which is solid at ambient temperature (23° C.), in contrast to a liquid plasticizing compound, such as an oil.

Hydrocarbon resins are polymers well known to a person skilled in the art, essentially based on carbon and hydrogen, which can be used in particular as plasticizing agents or tackifying agents in polymer matrices. They are by nature miscible (i.e., compatible) at the contents used with the polymer compositions for which they are intended, so as to act as true diluents. They have been described, for example, in the work entitled "*Hydrocarbon Resins*" by R. Mildenberg, M. Zander and G. Collin (New York, V C H, 1997, ISBN 3-527-28617-9), Chapter 5 of which is devoted to their applications, in particular in the tire rubber field (5.5. "*Rubber Tires and Mechanical Goods*"). They can be aliphatic, cycloaliphatic, aromatic, hydrogenated aromatic, of the aliphatic/aromatic type, that is to say based on aliphatic and/or aromatic monomers. They can be natural or synthetic and may or may not be oil-based (if such is the case, they are also known under the name of petroleum resins). Their Tg is preferably greater than 0° C., in particular greater than 20° C. (generally between 30° C. and 95° C.).

In a known way, these hydrocarbon resins can also be described as thermoplastic resins in the sense that they soften on heating and can thus be moulded. They can also be defined by a softening point or temperature, at which temperature the product, for example in the powder form, sticks together; this datum tends to replace the melting point, which is rather poorly defined, for resins in general. The softening temperature of a hydrocarbon resin is generally greater by approximately 50 to 60° C. than its Tg value.

In the composition of the invention, the softening temperature of the resin is preferably greater than 40° C. (in particular between 40° C. and 140° C.), more preferably greater than 50° C. (in particular between 50° C. and 135° C.).

The said resin is used at a content by weight of between 30 and 90 phr. Below 30 phr, the puncture-resistant performance has proved to be inadequate due to an excessively high stiffness of the composition, whereas, above 90 phr, exposure to an inadequate mechanical strength of the material exists with in addition a risk of a damaged performance at high temperature (typically greater than 70° C.). For these reasons, the content of resin is preferably between 40 and 80 phr, more preferably still at least equal to 45 phr, in particular within a range from 45 to 75 phr.

According to a preferred embodiment of the invention, the hydrocarbon resin exhibits at least any one, more preferably all, of the following characteristics:

- a Tg of greater than 25° C.;
- a softening point of greater than 50° C. (in particular of between 50° C. and 135° C.);
- a number-average molar mass (Mn) of between 400 and 2000 g/mol;
- a polydispersity index (PI) of less than 3 (reminder: PI=Mw/Mn with Mw the weight-average molar mass).

More preferably, this hydrocarbon resin exhibits at least any one, more preferably all, of the following characteristics:

- a Tg of between 25° C. and 100° C. (in particular between 30° C. and 90° C.);

a softening point of greater than 60° C., in particular of between 60° C. and 135° C.; an average mass Mn of between 500 and 1500 g/mol;

a polydispersity index PI of less than 2.

The softening point is measured according to Standard ISO 4625 ("Ring and Ball" method). The macrostructure (Mw, Mn and PI) is determined by steric exclusion chromatography (SEC) as indicated in the introduction to the patent application.

Mention may be made, as examples of such hydrocarbon resins, of those selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstirene homopolymer or copolymer resins, and the mixtures of these resins. Mention may more particularly be made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins, and the mixtures of these resins.

The term "terpene" combines here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Suitable as vinylaromatic monomer are, for example, stirene, α-methylstirene, ortho-methylstirene, meta-methylstirene, para-methylstirene, vinyltoluene, para-(tert-butyl)stirene, methoxystirenes, chlorostirenes, hydroxystirenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the resins selected from the group consisting of (D)CPD homopolymer resins, (D)CPD/stirene copolymer resins, polylimonene resins, limonene/stirene copolymer resins, limonene/D(CPD) copolymer resins, $C_5$ fraction/stirene copolymer resins, $C_5$ fraction/$C_9$ fraction copolymer resins, and the mixtures of these resins.

All the above resins are well known to a person skilled in the art and are commercially available, for example sold by DRT under the name "Dercolyte" as regards the polylimonene resins, by Neville Chemical Company under the name "Super Nevtac", by Kolon under the name "Hikorez" or by Exxon Mobil under the name "Escorez" as regards the $C_5$ fraction/stirene resins or $C_5$ fraction/$C_9$ fraction resins, or by Struktol under the name "40 MS" or "40 NS" (mixtures of aromatic and/or aliphatic resins).

I-3-C. Filler

The composition of the invention has the other essential characteristic of not comprising a filler or comprising a very small amount of filler, that is to say of comprising from 0 to less than 30 phr of at least one (that is to say, one or more) such optional filler.

Filler is understood here to mean any type of filler, whether reinforcing (typically having nanometric particles, with a weight-average size preferably of less than 500 nm, in particular between 20 and 200 nm) or nonreinforcing or inert (typically having micrometric particles, with a weight-average size of greater than 1 μm, for example between 2 and 200 μm).

These reinforcing or nonreinforcing fillers are essentially only present to give dimensional stability, that is to say a minimum mechanical strength, to the final composition. Less thereof is preferably placed in the composition in proportion as the filler is known to be reinforcing with respect to an elastomer, in particular a diene elastomer, such as natural rubber or polybutadiene.

An excessively high amount, in particular of greater than 30 phr, no longer makes it possible to achieve the minimum required properties of flexibility, deformability and ability to creep. For these reasons, the composition of the invention preferably comprises from 0 to less than 20 phr, more preferably from 0 to less than 10 phr, of filler.

Mention will in particular be made, as examples of fillers known as reinforcing to a person skilled in the art, of carbon black or of a reinforcing inorganic filler, such as silica, or a blend of these two types of filler.

All carbon blacks are suitable as carbon blacks, for example, in particular the blacks conventionally used in tires. Mention will for example be made, among the latter, of carbon blacks of 300, 600, 700 or 900 grade (ASTM) (for example, N326, N330, N347, N375, N683, N772 or N990). Suitable in particular as reinforcing inorganic fillers are highly dispersible mineral fillers of the silica ($SiO_2$) type, in particular precipitated or pyrogenic silicas exhibiting a BET specific surface of less than 450 $m^2/g$, preferably from 30 to 400 $m^2/g$.

Mention will in particular be made, as examples of fillers known as nonreinforcing or inert to a person skilled in the art, of ashes (i.e., combustion residues), microparticles of natural calcium carbonates (chalk) or synthetic calcium carbonates, synthetic silicates or natural silicates (such as kaolin, talc, mica), ground silicas, titanium oxides, aluminas or aluminosilicates. Mention may also be made, as examples of lamellar fillers, of graphite particles. Colouring fillers or fillers coloured, for example, by pigments can advantageously be used to colour the composition according to the colour desired.

The physical state under which the filler is provided is not important, whether in the form of a powder, microspheres, granules, beads or any other appropriate densified form. Of course, filler is also understood to mean mixtures of different reinforcing and/or nonreinforcing fillers.

A person skilled in the art will be able, in the light of the present description, to adjust the content of filler of the composition of the invention in order to achieve the property levels desired and to adjust the formulation to the specific application envisaged.

According to a specific and advantageous embodiment of the invention, if a reinforcing filler is present in the composition of the invention, its content is preferably less than 5 phr (i.e., between 0 and 5 phr), in particular less than 2 phr (i.e., between 0 and 2 phr). Such contents have proved to be particularly favourable to the manufacturing process for the composition of the invention, while providing the latter with an excellent self-sealing performance. Use is more preferably made of a content of between 0.5 and 2 phr, in particular when carbon black is concerned.

I-3-D. Various Additives

The base constituents described above, namely the blend of elastomers A and B, the plasticizing hydrocarbon resin and the optional filler, are sufficient by themselves alone for the composition of the invention to completely fulfil its puncture-resistant function with regard to the inflatable articles in which it is used.

In particular, it does not require the presence of a liquid plasticizer, such as a liquid elastomer, which can be harmful, as has already been said in the introduction to the present statement, when such a plasticizer is used in a large amount, to the fluidity properties and thus can result in risks of excessive creep or the composition when used at a relatively high temperature.

However, according to a specific embodiment of the invention, it can be of use in some cases, according to the specific application targeted, to use in a small amount, at a content preferably of less than 60 phr, a liquid plasticizer (liquid at 23° C.), referred to as "low Tg" plasticizer, the role of which is in particular to soften the matrix by diluting the diene elastomer matrix and the hydrocarbon resin, thus improving in particular the "cold" self-sealing performance (that is to say, typically for a temperature of less than 0° C.); its Tg is by definition less than −20° C. and is preferably less than −40° C.

Any liquid elastomer or any extending oil, whether of aromatic or nonaromatic nature, more generally any liquid plasticizing agent known for its plasticizing properties with respect to elastomers, in particular diene elastomers, can be used. At ambient temperature (23° C.), these plasticizers or these oils, which are more or less viscous, are liquids, in contrast in particular to hydrocarbon resins, which are by nature solid at ambient temperature.

To recapitulate, in contrast to a solid, liquid is understood to mean any substance having the ability to eventually assume, at the latest after 24 hours, solely under the effect of gravity and at ambient temperature (23° C.), the shape of the container in which it is present.

In contrast to solid elastomers, liquid plasticizers and elastomers (i.e., having a low molar mass) are characterized by a very low viscosity: preferably, their Brookfield viscosity, measured at 65° C., is less than 2 000 000 cP (cP meaning centipoise; 1 cP is equal to 1 mPa·s), more preferably less than 1 500 000 cP; it is in particular between 200 and 1 000 000 cP, typically, as regards liquid elastomers, between 2000 and 1 000 000 cP).

According to another possible definition, liquid elastomer is also understood to mean an elastomer for which the number-average molar mass (Mn) is less than 100 000 g/mol; preferably, in such a liquid elastomer, at least 80% and more preferably at least 90% of the area of the distribution of the molar masses (measured by SEC) is situated below 100 000 g/mol.

Suitable in particular are liquid elastomers for which the number-average molar mass (Mn) is between 400 and 90 000 g/mol, more generally between 800 and 90 000 g/mol, for example in the form of liquid BR, liquid SBR, liquid IR or liquid depolymerized natural rubber, such as are described, for example, in the abovementioned patent documents U.S. Pat. Nos. 4,913,209, 5,085,942 and No. 5,295, 525. If a liquid diene elastomer (for example liquid NR, liquid IR or liquid BR) is used as plasticizer, it can optionally be generated in situ, that is to say during the actual manufacture of the composition of the invention, for example by an appropriate (thermo)mechanical working (depolymerization by chain breakage) of the starting solid elastomers. Use may also be made of mixtures of such liquid elastomers with oils, such as described below.

Extending oils, in particular those selected from the group consisting of polyolefin oils (that is to say, resulting from the polymerization of olefins, monoolefins or diolefins, for example of the polyethylene glycol or polypropylene glycol type), paraffinic oils, naphthenic oils (of low or high viscosity and hydrogenated or nonhydrogenated), aromatic or DAE (Distillate Aromatic Extracts) oils, MES (Medium Extracted Solvates) oils, TDAE (Treated Distillate Aromatic Extracts) oils, mineral oils, vegetable oils (and their oligomers, e.g., palm, rapeseed, soybean or sunflower oils) and the mixtures of these oils, are also suitable.

According to a specific embodiment, use is made, for example, of an oil of the polybutene type, in particular a polyisobutylene (abbreviated to "PIB") oil, which has demonstrated an excellent compromise in properties in comparison with the other oils tested, in particular with a conventional oil of the paraffinic type. By way of examples, PIB oils are sold in particular by Univar under the name "Dynapak Poly" (e.g. "Dynapak Poly 190") and by BASF under the "Glissopal" (e.g. "Glissopal 1000") or "Oppanol" (e.g. "Oppanol B12") names; paraffinic oils are sold, for example, by Exxon under the name "Telura 618" or by Repsol under the name "Extensol 51".

Also suitable as liquid plasticizers are ether, ester, phosphate or sulphonate plasticizers, more particularly those selected from esters and phosphates. Mention may be made, as preferred phosphate plasticizers, of those which comprise between 12 and 30 carbon atoms, for example trioctyl phosphate. Mention may in particular be made, as preferred ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may be made, among the above triesters, as preferred glycerol triesters, of those which are composed predominantly (for more than 50% by weight, more preferably for more than 80% by weight) of an unsaturated $C_{18}$ fatty acid, that is to say a fatty acid selected from the group consisting of oleic acid, linoleic acid, linolenic acid and the mixtures of these acids. More preferably, whether of synthetic or natural origin (the case, for example, of sunflower or rapeseed vegetable oils), the fatty acid used is composed, for more than 50% by weight, more preferably still for more than 80% by weight, of oleic acid. Such triesters (trioleates) having a high content of oleic acid are well known—they have been described, for example, in Application WO 02/088238 (or US 2004/0127617)—as plasticizing agents in tire treads.

The number-average molar mass (Mn) of the liquid plasticizers other than liquid elastomers is preferably between 400 and 25 000 g/mol, more preferably still between 800 and 10 000 g/mol (measured by SEC, as indicated above for the hydrocarbon resin). For excessively low Mn masses, there can exist a risk of migration of the plasticizer to the outside of the composition, whereas excessively high masses can result in excessive stiffening of the composition. An Mn mass of between 1000 and 4000 g/mol has proved to constitute an excellent compromise for the targeted applications, in particular for use in a tire.

To sum up, the liquid plasticizer is preferably selected from the group consisting of liquid elastomers, polyolefin oils, naphthenic oils, paraffinic oils, DAE oils, MES oils, TDAE oils, mineral oils, vegetable oils, ether plasticizers, ester plasticizers, phosphate plasticizers, sulphonate plasticizers and the mixtures of these compounds. More preferably, this liquid plasticizer is selected from the group consisting of liquid elastomers, polyolefin oils, vegetable oils and the mixtures of these compounds.

A person skilled in the art will be able, in the light of the description and implementational examples which follow, to adjust the amount of liquid plasticizer as a function of the nature of the latter and of the specific conditions of use of the composition of the invention, in particular of the inflatable article in which it is intended to be used.

Preferably, the content of liquid plasticizer is within a range from 5 to 40 phr, more preferably within a range from 10 to 30 phr. Below the minima indicated, there is a risk of the elastomer composition exhibiting a stiffness which is too high for some applications, whereas, above the recommended maxima, a risk arises of insufficient cohesion of the composition and of a deterioration in the self-sealing properties.

Various other additives can be added to the components described above, typically in a small amount (preferably at contents of less than 20 phr, more preferably of less than 15 phr), such as, for example, protection agents, such as UV stabilizers, antioxidants or antiozonants, various other stabilizers, or colouring agents which can advantageously be used for the colouring of the composition of the invention. According to the application targeted, fibres, in the form of short fibres or of a slurry, might optionally be added to give greater cohesion to the composition.

According to a preferred embodiment of the invention, the composition additionally comprises a crosslinking agent which can be composed of just one or several compounds.

This crosslinking agent is preferably a crosslinking agent based on sulphur or a sulphur donor. In other words, this crosslinking agent is a "vulcanization" agent.

According to a preferred embodiment, the vulcanization agent comprises sulphur and, as vulcanization activator, a guanidine derivative, that is to say a substituted guanidine. Substituted guanidines are well known to a person skilled in the art (see, for example, WO 00/05300): mention will be made, as nonlimiting examples, of N,N'-diphenylguanidine (abbreviated to "DPG"), triphenylguanidine or di(o-tolyl) guanidine. Use is preferably made of DPG. The sulphur content is, for example, between 0.1 and 1.5 phr, in particular between 0.2 and 1.2 phr (in particular between 0.2 and 1.0 phr), and the content of guanidine derivative is itself between 0 and 1.5 phr, in particular between 0 and 1.0 phr (especially within a range from 0.2 to 0.5 phr).

Said crosslinking or vulcanization agent does not require the presence of a vulcanization accelerator. According to a preferred embodiment, the composition can thus be devoid of such an accelerator or at the very most can comprise less than 1 phr thereof, more preferably less than 0.5 phr thereof.

However, in general, if such an accelerator is used, mention may be made, as example, of any compound ("primary" or "secondary" accelerator) capable of acting as vulcanization accelerator for diene elastomers in the presence of sulphur, in particular accelerators of the thiazole type and their derivatives, accelerators of sulphenamide, thiuram, dithiocarbamate, dithiophosphate, thiourea and xanthate types. Mention may in particular be made, as examples of such accelerators, of the following compounds: 2-mercaptobenzothiazyl disulphide (abbreviated to "MBTS"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC"), 1-phenyl-2,4-dithiobiuret ("DTB"), zinc dibutyl phosphorodithioate ("ZBPD"), zinc 2-ethylhexyl phosphorodithioate ("ZDT/S"), bis[O,O-di(2-ethylhexyl)thiophosphonyl]disulphide ("DAPD"), dibutylthiourea ("DBTU"), zinc isopropyl xanthate ("ZIX") and the mixtures of these compounds. According to another advantageous embodiment, the above vulcanization system can be devoid of zinc or of zinc oxide (known as vulcanization activators) or at the very most can comprise less than 1 phr thereof, more preferably less than 0.5 phr thereof.

According to another preferred embodiment of the invention, the vulcanization agent comprises a sulphur donor. The amount of such a sulphur donor will be adjusted preferably to between 0.5 and 15 phr, more preferably between 0.5 and 10 phr (in particular between 1 and 5 phr), in particular so as to achieve the preferred equivalent sulphur contents indicated above.

Sulphur donors are well known to a person skilled in the art; mention will in particular be made of thiuram polysulphides, which are known vulcanization accelerators and which have the formula (I):

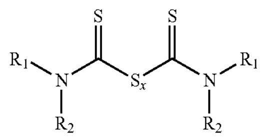

in which:

- x is a number (integer, or decimal number in the case of mixtures of polysulphides) which is equal to or greater than two, preferably within a range from 2 to 8;
- $R_1$ and $R_2$, which are identical or different, represent a hydrocarbon radical preferably chosen from alkyls having from 1 to 6 carbon atoms, cycloalkyls having from 5 to 7 carbon atoms, or aryls, aralkyls or alkaryls having from 6 to 10 carbon atoms.

In the above formula (I), $R_1$ and $R_2$ might form a divalent hydrocarbon radical comprising from 4 to 7 carbon atoms.

These thiuram polysulphides are more preferably selected from the group consisting of tetrabenzylthiuram disulphide ("TBzTD"), tetramethylthiuram disulphide ("TMTD"), dipentamethylenethiuram tetrasulphide ("DPTT"), and the mixtures of such compounds. Use is more preferably made of TBzTD, particularly at the preferred contents indicated above for a sulphur donor (i.e., between 0.1 and 15 phr, more preferably between 0.5 and 10 phr, in particular between 1 and 5 phr).

In addition to the solid elastomers and other additives described above, the composition of the invention might also comprise, preferably according to a minor fraction by weight with respect to the blend of solid elastomers A and B, solid polymers other than elastomers, such as, for example, thermoplastic polymers.

I-4. Manufacture of the Self-Sealing Composition

The composition described above can be manufactured by any appropriate means, for example by compounding and/or kneading in blade mixers, open mills or compounding screw extruders, until an intimate and homogeneous mixture of its various components is obtained.

However, the following manufacturing problem may be presented: in the absence of filler, or at the very least of a significant amount of filler, the composition of the invention exhibits weak cohesion. This lack of cohesion may be such that the adhesiveness of the composition, furthermore due to the presence of a relatively high content of hydrocarbon resin, is not compensated for and prevails; this then results in a risk of undesirable adhesive bonding to the compounding equipment used, which may be unacceptable under industrial processing conditions.

In order to overcome the above problems, the composition of the invention, when it comprises a crosslinking agent, can preferably be prepared according to a process comprising the following stages:

a) in a first step, a masterbatch comprising at least the blend of the solid elastomers A and B and between 30 and 90 phr of the hydrocarbon resin is manufactured by mixing these various components in a mixer, at a temperature or up to a temperature referred to as "hot compounding temperature" (or "first temperature") which is greater than the softening point of the hydrocarbon resin;

b) then, in a second step, all or at least 50% by weight of the crosslinking agent is incorporated in the said masterbatch, everything being mixed, in the same mixer or in a different mixer.

The hot compounding temperature above is, of course, that of the masterbatch measurable in situ and not the set temperature of the mixer itself.

"Masterbatch" or "intermediate composition" should be understood as meaning the mixture of at least the elastomer matrix (in this case, the two elastomers A and B) with the hydrocarbon resin, the precursor mixture of the final ready-for-use self-sealing composition. Various additives can optionally be incorporated in this masterbatch, whether they are intended for the masterbatch proper (for example, a stabilizing agent, a colouring agent, a UV stabilizer, an antioxidant, and the like) or for the final self-sealing composition for which the masterbatch is intended.

The masterbatch can be manufactured in any compounding equipment, in particular in a blade mixer, an open mill, an extruding machine or any mixer capable of sufficiently mixing or kneading its various components until a homogeneous intimate mixture of the said components is obtained. Preferably, use is made of a compounding screw extruder, having or not having a constant pitch, capable in a known way of introducing significant shearing of the mixture (at least diene elastomer and resin) being formed.

In the initial state, that is to say before contact thereof with the elastomers, the resin can exist in the solid state or the liquid state. Preferably, for better compounding, the solid elastomers A and B are brought into contact with the hydrocarbon resin in the liquid state. It is sufficient for this to heat the resin to a temperature greater than its softening point. According to the type of hydrocarbon resin used, the hot compounding temperature is preferably greater than 70° C., more preferably greater than 90° C., for example between 100° C. and 150° C.

For optimum compounding of the masterbatch, the hydrocarbon resin is preferably injected in the liquid state, under pressure, into the mixer.

According to another preferred embodiment, in combination or not in combination with the above, the hot compounding stage (a) is carried out with the exclusion of oxygen. The injection of the resin under pressure, at a temperature at which the resin is completely molten, has the advantage of introducing, into the compounding chamber of the mixer, a degassed resin which is more stable mechanically and chemically.

The stage (b) of incorporation of all or part of the crosslinking agent can be carried out on the same mixer as that of the stage (a) which precedes, preferably a compounding screw extruder, or else on another type of mixer, for example another compounding screw extruder or an external mixer of the two-roll open mill type.

According to a preferred embodiment, in particular when an external mixer of the two-roll open mill type is used, stage (b) is carried out at a maximum temperature or up to a maximum temperature which is kept lower than the softening point of the resin, in order to limit the risks of excessive undesirable adhesive bonding of the masterbatch to the compounding equipment. Thus, according to the type of hydrocarbon resin used, the compounding temperature of stage (b) can preferably be less than 50° C., more preferably between 20° C. and 40° C.

According to another specific embodiment, independently of the softening point of the resin, this being the case whatever the compounding equipment used for stage (b), the latter is carried out at a maximum temperature or up to a maximum temperature which is kept lower than 130° C., preferably lower than 100° C., in particular lower than 80° C.

If need be, an intermediate stage of cooling the masterbatch can be inserted between stages (a) and (b) described above, in order to bring its temperature to the value desired before beginning stage (b), whether a targeted temperature lower than the softening point of the resin or, independently, a targeted temperature lower than 130° C., preferably lower than 100° C., in particular lower than 80° C., this before introduction (stage (b)) of all or part of the crosslinking agent into the masterbatch manufactured previously.

When a filler, such as carbon black, is used, it can be introduced during stage (a), that is to say at the same time as the elastomers A and B and the hydrocarbon resin, or else during stage (b), that is to say at the same time as the crosslinking agent. It has been found that a very small proportion of carbon black, preferably between 0.5 and 2 phr, further improved the compounding and the manufacture of the composition, and its final extrudability.

The optional liquid plasticizer can be incorporated at any time, in all or part, during any one of the stages of the process, in particular during the stage (a) of manufacture of the masterbatch itself (in this case, before, during or after the incorporation of the hydrocarbon resin in the blend of elastomers A and B), "hot" (that is to say, at a temperature greater than the softening point of the resin) or at a lower temperature, or, for example, after the manufacture of the masterbatch (in this case, before, during or after addition of the crosslinking agent, indeed even during the final forming (extrusion) of the composition of the invention).

According to a specific embodiment, the liquid plasticizer is introduced, for example, at least in part, during the stage (a) of manufacture of the masterbatch, more preferably in this case either at the same time as the hydrocarbon resin or after introducing the latter. According to an advantageous embodiment, a mixture of the hydrocarbon resin and of the liquid plasticizer can be prepared prior to the incorporation in the solid elastomer matrix.

According to another specific embodiment, the liquid plasticizer is introduced, for example, at least in part, during the stage (b) of incorporation of the crosslinking agent.

According to another specific embodiment, the liquid plasticizer can be incorporated, in all or part, during a stage (c) subsequent to stage (b), that is to say after incorporation of the crosslinking agent, in the same mixer or a different mixer from that of stage (b), whether, for example, a compounding screw extruder or an external mixer of the two-roll open mill type. This incorporation is possible on the same external mixer but it can be advantageous to use a compounding screw extruder into which first the mixture resulting from stage (b) and then the liquid plasticizer are introduced, such a compounding screw extruder being equipped with a zone in which strong shearing is applied and thus making possible good homogenization of the final self-sealing composition.

According to another specific embodiment, if not all of the crosslinking agent is introduced during stage (b), then the remainder of this crosslinking agent can be introduced in stage (a) or in the additional stage (c) described above.

It is also possible to successively carry out all the stages of manufacture of the composition of the invention with just one device, a compounding screw extruder equipped with means for introducing and metering the various constituents positioned in offset fashion along the compounding chamber, with appropriate homogenization zones and with a die suited to the semi-finished product manufactured.

On exiting from stage (b) or optionally from stage (c) described above, the manufacture of the composition of the invention is completed; it is formed dimensionally in a way known per se, for example by extrusion through a die with dimensions suited to the semi-finished product chosen, for example a relatively wide rubber layer, a narrow strip or a profiled element capable of being directly used in the assembling of a tire blank or also a strip which can be reused subsequently in an extrusion device.

Such a process has proven to be particularly well suited to the rapid manufacture, under processing conditions acceptable from an industrial viewpoint, of the composition in accordance with the invention, it being possible for this composition to comprise relatively high contents of hydrocarbon resin without requiring in particular the use of elastomer in the liquid state as plasticizer.

Figure 2:
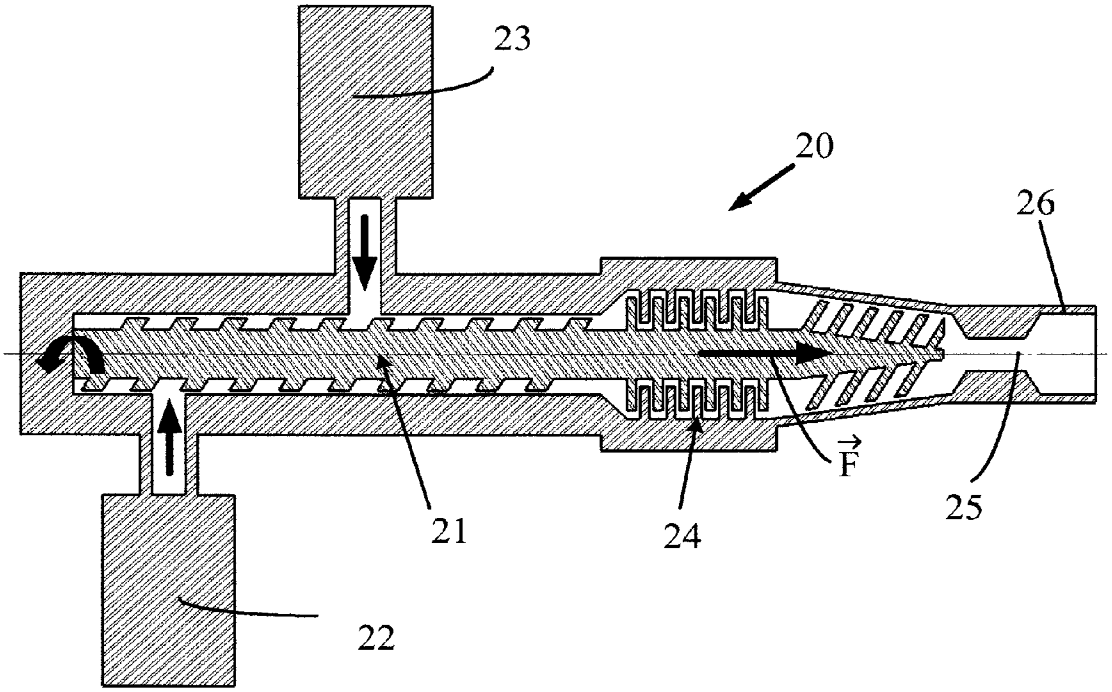
FIG. 2 shows an example of an extrusion-compounding device which can be used for the manufacture of a composition in accordance with an embodiment of the invention.

The stage (a) of manufacture of the masterbatch is preferably carried out in a compounding screw extruder as represented diagrammatically, for example, in a simple way in FIG. 2.

This FIG. 2 shows a compounding screw extruder (20) essentially comprising an extrusion screw (for example a single screw) (21), a first metering pump (22) for the blend of elastomers A and B (solid) and a second metering pump (23) for the resin (solid or liquid) and optionally the liquid plasticizer. The elastomer A and the elastomer B can be introduced by means of a single metering pump, if they have already been mixed together beforehand, or else can be introduced separately by means of two separate metering pumps (just one has been represented in FIG. 2, for simplicity). Likewise, the hydrocarbon resin and the optional liquid plasticizer can be introduced themselves also by means of a single metering pump, if they have already been mixed beforehand, or else can be introduced separately by means of two separate metering pumps (just one represented in FIG. 2). The metering pumps (22, 23) make it possible to increase in pressure while retaining control of the metering and the initial characteristics of the materials, the separation of the metering (elastomers and resin) and compounding functions in addition offering better control of the process.

The products, pushed by the extrusion screw, are intimately mixed under the very strong shearing contributed by the rotation of the screw, thus progressing through the mixer, for example up to a "chopper-homogenizer" part (24), at the outlet of which zone the final masterbatch (25) thus obtained, progressing in the direction of the arrow (F), is finally extruded through a die (26) which makes it possible to extrude the product at the desired dimensions.

According to a specific embodiment, it can be advantageous to maintain the "chopper-homogenizer" part at a lower temperature than that of the extrusion screw, for example at a temperature of between 40° C. and 60° C., this being done in order to limit the adhesiveness of the masterbatch and thus to improve the mechanical working and the homogeneity of the masterbatch.

By way of example, the masterbatch thus extruded, which is ready to be used, can be subsequently transferred and cooled, for example on an external mixer of the two-roll open mill type, for introduction of the crosslinking agent (all of it or at least 50% by weight) and of the optional filler; the temperature inside the said external mixer of the two-roll open mill type is preferably kept lower than the softening point of the resin, furthermore preferably being less than 100° C., in particular less than 80° C. Advantageously, the above rolls are cooled, for example by circulation of water, to a temperature of less than 40° C., preferably of less than 30° C., so as to prevent or limit undesirable adhesive bonding of the composition to the walls of the mixer.

It is possible to directly form the masterbatch at the outlet of the extrusion device (20) in order to make it easier to transport it and/or to place it on the external mixer. It is also possible to use continuous feeding of the external mixer of the two-roll open mill type.

By virtue of the preferred specific device and preferred process described above, it is possible to prepare the composition of the invention under satisfactory industrial conditions, without the risk of contaminating the equipment due to excessive undesirable adhesive bonding of the composition to the walls of the mixers.

I-5. Use of the Composition of the Invention as Puncture-Resistant Layer

The composition having a self-sealing property described above is a solid composition (at 23° C.) which is characterized in particular, by virtue of its specific formulation, by very great flexibility and high deformability. Its Mooney viscosity, measured at 35° C. in the raw state (i.e., before curing), is preferably greater than 20, more preferably between 20 and 80, according to its specific formulation and the application targeted, in particular according to the presence or absence of a liquid plasticizing agent.

It can be used as puncture-resistant layer in any type of "inflatable" article, that is to say, by definition, any article which takes its useable form when inflated with air. Mention may be made, as examples of such inflatable articles, of inflatable boats, or balls used for play or sport.

It is particularly well suited to use as puncture-resistant layer in an inflatable article, a finished or semi-finished product, made of rubber, very particularly in a tire for a motor vehicle, such as a vehicle of the two-wheel, passenger or industrial type, or a vehicle other than a motor vehicle, such as a bicycle.

Such a puncture-resistant layer is preferably positioned on the internal wall of the inflatable article, completely or least partially covering it, but it can also be completely incorporated into its internal structure.

The thickness of the puncture-resistant layer is preferably greater than 0.3 mm, more preferably between 0.5 mm and 10 mm (in particular between 1 and 5 mm).

It will be easily understood that the embodiment of the invention can vary according to the specific application ranges and the dimensions and pressures involved, the puncture-resistant layer then comprising several preferred ranges of thickness. Thus, for example, for tires of passenger vehicle type, it can have a thickness of at least 0.5 mm, preferably between 1 and 5 mm. According to another example, for tires for heavy duty or agricultural vehicles, the preferred thickness can lie between 1 and 6 mm. According to another example, for tires for vehicles in the field of earthmoving equipment or for aircraft, the preferred thickness can lie between 2 and 10 mm. Finally, according to another example, for bicycle tires, the preferred thickness can lie between 0.4 and 2 mm.

The composition of the invention has the advantage of exhibiting, within a very wide range of operating temperatures for the tires, virtually no disadvantage in terms of rolling resistance in comparison with a tire not comprising a self-sealing layer. In comparison with normal self-sealing compositions, the risks of excessive creep during use at relatively high temperature (typically greater than 60° C.), a temperature frequently encountered during the use of some tires, are notably reduced. Its self-sealing properties are also improved during use at low temperature (typically less than 0° C.).

Of course, the invention applies to the cases where the composition of the invention defined above, in the raw state (i.e., noncrosslinked state) and in the cured state (i.e., crosslinked or vulcanized state), is used in a tire or any other inflatable article without necessarily being combined with an airtight layer.

However, according to a specific and preferred embodiment of the invention, the composition of the invention is used in combination with at least one airtight layer, in order to form a multilayer, self-sealing and airtight laminated product which can be used in particular as internal wall of an inflatable article, such as a tire.

The second layer of the laminate can comprise any type of material capable of performing the role of airtight film (or more generally gastight film), whether it is, for example, a metal material or a polymer material. Preferably, this airtight layer has a thickness of greater than 0.05 mm, more preferably between 0.05 and 6 mm (for example, from 0.1 to 2 mm).

According to a preferred embodiment, this second airtight layer comprises a butyl rubber composition. Butyl rubber should be understood as meaning, in a known way, a copolymer of isobutylene and isoprene (abbreviated to IIR), and also the halogenated versions, preferably chlorinated or brominated versions, of this type of copolymer. Preferably, the butyl rubber is a halogenated butyl rubber or a blend of halogenated and nonhalogenated butyls. The butyl rubber can be used alone or in combination with one or more other elastomer(s), in particular diene elastomer(s), such as, for example, natural rubber or a synthetic polyisoprene.

According to another preferred embodiment, this second airtight layer comprises a thermoplastic stirene elastomer (TPS) composition, preferably comprising polystirene and polyisobutylene blocks, such as described, for example, in Patent Applications WO 2008/145276, WO 2008/145277 or WO 2009/007064.

The airtight composition furthermore comprises the various additives normally present in the airtight layers known to a person skilled in the art, such as reinforcing fillers, for example carbon black, lamellar fillers which improve the airtightness (for example, phyllosilicates, such as kaolin, talc, mica, clays or modified clays ("organoclays"), protection agents, such as antioxidants or antiozonants, a crosslinking system (for example based on sulphur or peroxide), various processing aids or other stabilizers.

The two layers of the laminate above can be brought together by any appropriate means, for example by a simple heat treatment, preferably under pressure (for example a few minutes at 150° C. under 16 bar), using various adhesive agents or also by inserting a third adhesive layer which renders the other two integral.

II. Implementational Example of the Invention

The composition of the invention having a self-sealing property and the multilayer laminate described above can advantageously be used in the tires of all types of vehicles, in particular in tires for passenger vehicles capable of running at very high speed or tires for industrial vehicles, such as heavy duty vehicles, capable of running and operating under particularly high internal temperature conditions.

By way of example, the appended FIG. 1 represents, highly schematically (without observing a specific scale), a radial cross section of a tire in accordance with the invention.

This tire 1 comprises a crown 2 reinforced by a crown reinforcement or belt 6, two sidewalls 3 and two beads 4, each of these beads 4 being reinforced with a bead wire 5. The crown 2 is surmounted by a tread, not represented in this schematic figure. A carcass reinforcement 7 is wound around the two bead wires 5 in each bead 4, the turn-up 8 of this reinforcement 7 being, for example, positioned towards the outside of the tire 1, which is here represented fitted to its wheel rim 9. The carcass reinforcement 7 is, in a way known per se, composed of at least one ply reinforced by cables, known as "radial" cables, for example of textile or metal, that is to say that these cables are positioned virtually parallel to one another and extend from one bead to the other so as to form an angle of between 80° and 90° with the median circumferential plane (plane perpendicular to the axis of rotation of the tire which is situated at mid-distance from the two beads 4 and passes through the middle of the crown reinforcement 6).

The tire 1 is characterized in that its internal wall comprises a multilayer laminate (10) comprising at least two layers (10*a*, 10*b*), which is self-sealing by virtue of its first layer (10*a*) and airtight by virtue of its second layer (10*b*).

In accordance with a preferred embodiment of the invention, the two layers (10*a*, 10*b*) cover substantially the entire internal wall of the tire, extending from one sidewall to the other, at least as far as the level of the rim flange when the tire is in the fitted position. According to other possible embodiments, the layer 10*a* might, however, cover only a portion of the airtight region (layer 10*b*), for example only the crown region of the tire, or might extend at least from the crown region as far as the shoulders or as far as the middle of the sidewall (equator) of the said tire.

According to another preferred embodiment, the laminate is positioned in such a way that the first self-sealing layer (10*a*) is radially the innermost of the two in the tire, with respect to the other layer (10*b*), as represented diagrammatically in the appended FIG. 1. In other words, the self-sealing layer (10*a*) covers the airtight layer (10*b*) on the side of the internal cavity 11 of the tire 1. Another possible embodiment is that where this layer (10*a*) is radially the outermost of the two, then positioned between the airtight layer (10*b*) and the remainder of the structure of the tire 1.

In this example, the layer 10*b* (with a thickness of 0.7 to 0.8 mm) is based on butyl rubber and exhibits a conventional formulation for an inner liner, which normally defines, in a conventional tire, the radially internal face of the said tire. This airtight layer 10*b* thus makes it possible to inflate the tire 1 and to keep it pressurized; its airtightness properties allow it to guarantee a relatively low rate of loss of pressure, making it possible to keep the tire inflated, in a normal operating state, for a sufficient period of time, normally several weeks or several months.

The layer 10*a* is, for its part, composed of a self-sealing composition in accordance with the invention comprising, in this example, a solid unsaturated diene elastomer (blend of 50 phr of solid NR with 50 phr of solid BR; number-average molar mass Mn of the blend of elastomers equal to approximately 270 000 g/mol in the final composition); a hydrocarbon resin "Escorez 2101" from Exxon Mobil (Tg equal to approximately 44° C.; softening point equal to approximately 90° C.; Mn equal to approximately 800 g/mol; PI equal to approximately 2.1) at a content by weight of approximately 50 phr; approximately 15 phr of liquid polybutadiene elastomer ("Ricon 154" from Sartomer Cray Valley—Tg equal to approximately −20° C.; Mn equal to approximately 5000 g/mol and PI equal to approximately 1.4); and 0.5 phr of sulphur combined with 0.5 phr of DPG; in addition, it comprises a very small amount (approximately 1 phr) of carbon black (N772) and approximately 3 phr of antioxidant.

The Mooney viscosity ML (1+4) at 100° C. of the two starting elastomers, BR and NR, is respectively equal to approximately 45 and approximately 85. For each of the two elastomers, more than 80% of the area of the distribution of the molar masses (measured by SEC) is situated above 100 000 g/mol.

The above self-sealing composition was prepared using a single-screw extruder (L/D=40), such as represented diagrammatically in FIG. 2 (already commented on above); the mixing of the four base constituents (BR, NR, resin and liquid plasticizer) was carried out at a temperature (of between 100 and 130° C.) greater than the softening temperature of the resin. The extruder used comprised three different feeds (hoppers) (BR, NR and finally resin and liquid plasticizer mixed beforehand at a temperature of 130 to 140° C. approximately) and a pump for liquid injection under pressure for the resin/liquid plasticizer mixture (injected at a temperature of 100 to 110° C. approximately); when the elastomers A and B, the resin and the liquid plasticizer are thus intimately mixed, it was found that the undesirable adhesiveness of the composition very significantly decreased.

The above extruder was provided with a die which makes it possible to extrude the masterbatch at the desired dimensions (for example in the form of a strip) into an external mixer of the two-roll open mill type, for final incorporation of the other constituents, namely, in this example, all of the crosslinking agent (sulphur and DPG), the antioxidant and the carbon black, at low temperature kept at a value of less than +30° C. (cooling the rolls by circulation of water).

The layer 10*a*, positioned, for example, in FIG. 1, between the layer 10*b* and the cavity 11 of the tire, makes it possible to provide the tire with effective protection against pressure losses due to accidental perforations, by making possible the automatic sealing of these perforations.

If a foreign body, such as a nail, passes through the structure of the inflatable article, for example a wall, such as a sidewall 3, or the crown 6 of the tire 1, the composition of the invention acting as self-sealing layer is subjected to several stresses. On reacting to these stresses, and by virtue of its advantageous properties of deformability and elasticity, the said composition creates an airtight contact region all around the body. It is of little significance whether the outline or profile of the latter is uniform or regular; the flexibility of the self-sealing composition allows the latter to intrude into openings of minimum size. This interaction between the self-sealing composition and the foreign body confers airtightness on the region affected by the latter.

In the event of removal, accidental or deliberate, of the foreign body, a perforation remains: the latter is capable of creating a leak of greater or lesser significance according to the size of the perforation. The self-sealing composition of the invention, subjected to the effect of hydrostatic pressure, is sufficiently flexible and deformable to seal off the perforation by being deformed, preventing inflating gas from leaking out. In the case in particular of a tire, it has turned out that the flexibility of the self-sealing composition of the invention makes it possible to withstand, without any problem, the strains of the surrounding walls, even during phases in which the loaded tire deforms when running.

The tire provided with its puncture-resistant layer (10*a*) as described above can be produced before or after vulcanization (or curing).

In the first case (i.e., before curing the tire), the self-sealing composition of the invention is simply applied in a conventional fashion to the desired place, for formation of the layer 10*a*. The vulcanization is subsequently carried out conventionally.

An alternative manufacturing form which is advantageous, for a person skilled in the art of tires, will consist, for example during a first stage, in depositing the self-sealing composition flat directly on a tire-building drum, in the form of a skim of suitable thickness (for example from 2 to 6 mm), before covering the latter with the airtight layer, followed by the remainder of the structure of the tire, according to manufacturing techniques well known to a person skilled in the art. In addition, this type of process makes it possible to easily carry out the second embodiment in which the airtight layer 10*b* would be the innermost radially.

In the second case (i.e., after curing the tire), the self-sealing composition is applied to the inside of the cured tire by any appropriate means, for example by adhesive bonding, by spraying or by extrusion and blow-moulding of a film of appropriate thickness.

During trials, tires of passenger vehicle type, of 205/55 R16 size, "Michelin, Energy 3 brand", were tested. The internal wall of the tires (already comprising the airtight layer (10*b*) was covered with the self-sealing layer (10*a*) described above, with a thickness of 3 mm, and then the tires were vulcanized.

Four perforations with a diameter of 5 mm were then produced on one of the fitted and inflated tires, through the tread and the crown block, using punches which were immediately removed.

Unexpectedly, this tire withstood being run on a rolling drum at 150 km/h, under a nominal load of 400 kg, without loss in pressure for more than 1500 km, after which distance running was halted.

Without a self-sealing composition and under the same conditions as above, the tire thus perforated loses its pressure in less than a minute, becoming completely unsuitable for running.

Cold performance tests, carried out this time on a rolling device at a temperature of −20° C., have confirmed excellent self-sealing properties for the composition of the invention.

The invention claimed is:

1. An inflatable article comprising a puncture-resistant layer, said layer comprising an elastomer composition having a self-sealing property, wherein the composition comprises (phr meaning parts by weight per 100 parts of solid elastomer):

a blend of at least two solid elastomers, a polybutadiene or butadiene copolymer elastomer, referred to as "elastomer A", and a natural rubber or synthetic polyisoprene elastomer, referred to as "elastomer B", the elastomer A: elastomer B ratio by weight being within a range from 10:90 to 90:10;

between 30 and 90 phr of a hydrocarbon resin; and from 0 to less than 30 phr of filler.

2. The article according to claim 1, wherein said layer has a thickness of greater than 0.3 mm.

3. The article according to claim 2, wherein said layer has a thickness of between 0.5 mm and 10 mm.

4. The article according to claim 1, wherein said layer is deposited on the internal wall of the inflatable article.

5. The article according to claim 1, wherein the inflatable article is an article made of rubber.

6. The article according to claim 5, wherein the inflatable article is a tire.

7. The article according to claim 1, wherein said layer is used in combination with an airtight layer, thus forming a self-sealing and airtight laminate.

8. The article according to claim 7, wherein the airtight layer is based on butyl rubber or a thermoplastic stirene elastomer.

* * * * *